US011918429B2

(12) United States Patent
Bondurant

(10) Patent No.: US 11,918,429 B2
(45) Date of Patent: Mar. 5, 2024

(54) CORDLESS WATER FLOSSER

(71) Applicant: WATER PIK, INC., Fort Collins, CO (US)

(72) Inventor: Thomas A. Bondurant, Fort Collins, CO (US)

(73) Assignee: WATER PIK, INC., Fort Collins, CO (US)

( * ) Notice: Subject to any disclaimer, the term of this patent is extended or adjusted under 35 U.S.C. 154(b) by 589 days.

(21) Appl. No.: 16/797,264

(22) Filed: Feb. 21, 2020

(65) Prior Publication Data

US 2020/0268490 A1  Aug. 27, 2020

Related U.S. Application Data

(60) Provisional application No. 62/809,412, filed on Feb. 22, 2019.

(51) Int. Cl.
*A61C 17/02* (2006.01)
*A61C 17/024* (2006.01)
*A61C 17/028* (2006.01)
*A61H 13/00* (2006.01)

(52) U.S. Cl.
CPC ........ *A61C 17/0202* (2013.01); *A61C 17/024* (2019.05); *A61C 17/028* (2013.01); *A61H 13/005* (2013.01)

(58) Field of Classification Search
CPC . A61C 17/0202; A61C 17/024; A61C 17/028; A61C 17/02; A61C 17/14;

(Continued)

(56) References Cited

U.S. PATENT DOCUMENTS 3,873,062 A * 3/1975 Johnson ................ F16L 37/133
285/317
5,306,146 A   4/1994 Warren et al.
(Continued)

FOREIGN PATENT DOCUMENTS

CN    108732910    11/2018
CN    209847430    12/2019
(Continued)

OTHER PUBLICATIONS

International Search Report for Corresponding PCT Application No. PCT/US2020/019201 dated Aug. 26, 2020. WO.

*Primary Examiner* — Ralph A Lewis
*Assistant Examiner* — Mirayda A Aponte
(74) *Attorney, Agent, or Firm* — Dorsey & Whitney LLP

(57) ABSTRACT

A water flosser is provided that may include a body, a reservoir, a cap coupled to the body and a tip extending through an opening in the cap. The water flosser may include a latch assembly that selectively retains the tip to the body. In one embodiment, the cap, the tip and the latch assembly are all rotatable as a unit about a defined axis relative to the body. An ejector button may be provided to actuate the latch assembly. In one embodiment, the ejector button extends through an upper surface of the cap. Actuation of the latch assembly may include displacement of the ejector button in a direction that is parallel with a rotational axis of the tip. In some embodiments, the reservoir of a water flosser includes a tapering volumetric section that concentrates a volume of fluid about an inlet of a tube coupled with a pump.

23 Claims, 15 Drawing Sheets

(58) Field of Classification Search
CPC ..... A61C 17/00; A61C 15/046; A61C 17/032; A61C 1/0061; A61H 13/005; A61H 13/00; A61H 2201/0153; C07C 407/00
USPC .......................................................... 433/216
See application file for complete search history.

(56) References Cited

U.S. PATENT DOCUMENTS

| | | |
|---|---|---|
| 5,489,205 A | 2/1996 | Davis et al. |
| 9,061,096 B2 | 6/2015 | Taylor et al. |
| D780,908 S | 3/2017 | Ladwig |
| 9,775,692 B2 | 10/2017 | Thomas et al. |
| D804,016 S | 11/2017 | Ladwig |
| D815,274 S | 4/2018 | Ladwig |
| D819,196 S | 5/2018 | Kim et al. |
| 10,617,500 B2 | 4/2020 | Snyder et al. |
| 2007/0203439 A1* | 8/2007 | Boyd ................. A61C 17/0205 601/165 |
| 2011/0027749 A1* | 2/2011 | Syed .......................... A61L 2/16 433/82 |
| 2014/0106296 A1* | 4/2014 | Woodard ............... A61C 15/00 433/80 |
| 2016/0151133 A1 | 6/2016 | Luettgen et al. |

FOREIGN PATENT DOCUMENTS

| | | |
|---|---|---|
| JP | H08506978 | 7/1996 |
| JP | 2018070243 | 5/2018 |
| KR | 20130080902 | 7/2013 |
| WO | 2018086374 | 5/2018 |

* cited by examiner

CORDLESS WATER FLOSSER

CROSS-REFERENCE TO RELATED APPLICATIONS

This application claims priority to U.S. Provisional Patent Application No. 62/809,412, filed Feb. 22, 2019, and entitled "Cordless Water Flosser," which is hereby incorporated by reference herein in its entirety for all purposes.

TECHNICAL FIELD

The present disclosure relates to health and personal hygiene equipment. More particularly, the present disclosure relates to cordless water flossers.

BACKGROUND

Water flossers, also referred to as oral irrigators, may be used to clean a user's teeth and gums by discharging a pressurized, pulsating fluid stream into a user's oral cavity. The fluid impacts the teeth and gums to remove debris. Water flossers may come in a variety of configurations including countertop models that are powered by an AC outlet as well as handheld models that are battery powered and are self-contained, meaning that all components, including the reservoir, are contained in or are immediately associated with a hand-holdable body. Different configurations provide different advantages.

SUMMARY

The present disclosure provides embodiments of a water flosser including various components and features associated with water flossers. In accordance with one embodiment, a water flosser may include a body and a cap coupled with the body. A tip may extend through an opening of the cap. A latch assembly is configured to selectively retain the tip. The cap, the tip and the latch assembly are all rotatable as a unit about a defined axis relative to the body.

In accordance with another embodiment of the present disclosure, a water flosser may include a body, a cap rotatably coupled to the body and a tip extending through an opening in the cap along a defined axis. A latch assembly is configured to selectively retain the tip, wherein the latch assembly includes an ejector button extending through an upper surface of the cap. Actuation of the latch assembly includes displacement of the ejector button in a direction that is parallel with the defined axis.

In accordance with a further embodiment of the present disclosure, a water flosser comprises a body, a reservoir associated with the body, a battery disposed in the body, and a pump disposed in the body. The pump is in fluid communication with the reservoir and configured to draw fluid from the reservoir through a tube, pressurize the fluid, and discharge the fluid from a tip coupled to the body. The reservoir includes a lower section having a tapered volume that converges towards a floor, wherein an inlet of the tube is disposed adjacent the floor.

While multiple examples are disclosed, still other examples of the present invention will become apparent to those skilled in the art from the following detailed description, which shows and describes illustrative examples of the invention. As will be realized, the invention is capable of modifications in various aspects, all without departing from the spirit and scope of the present invention. Accordingly, the drawings and detailed description are to be regarded as illustrative in nature and not restrictive.

DETAILED DESCRIPTION

Figure 1:
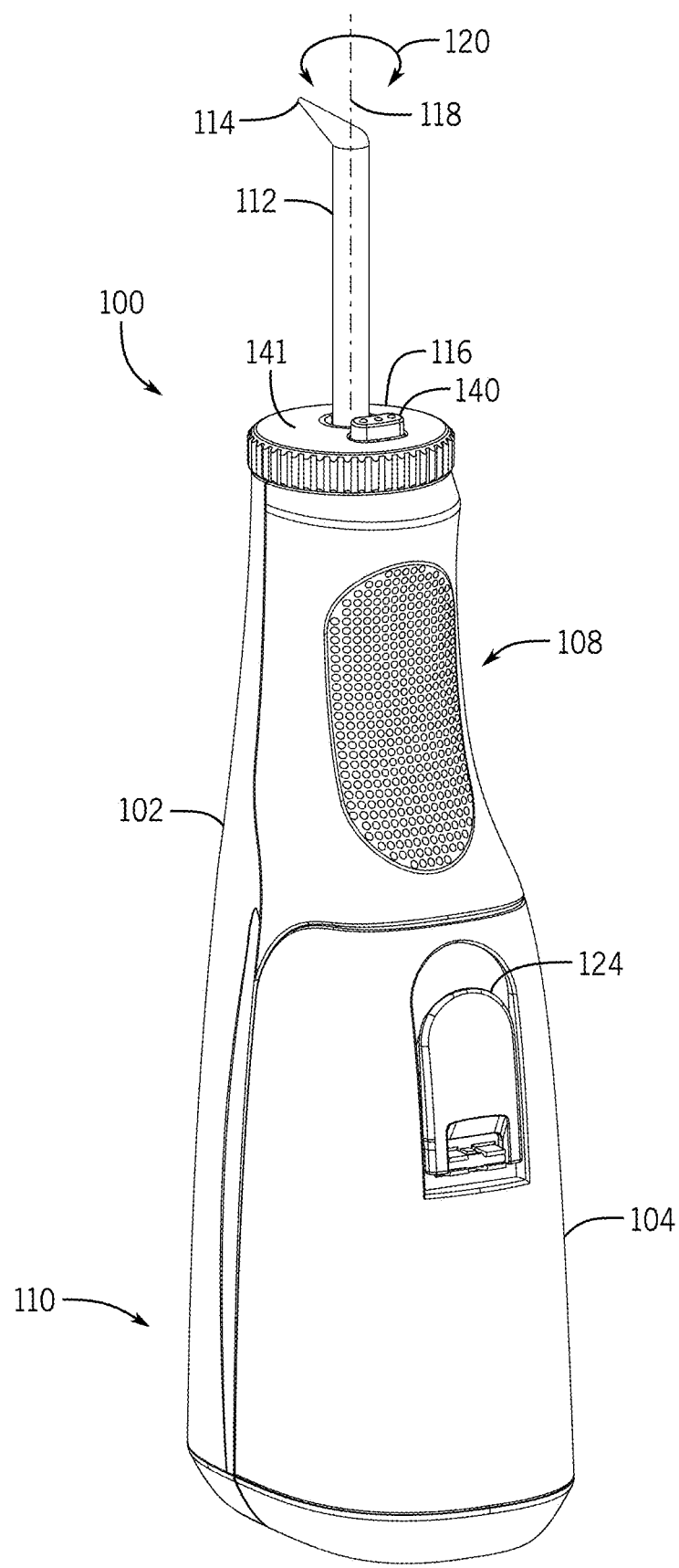
FIG. 1 is a rear perspective view of water flosser according to an embodiment of the present disclosure.

The present disclosure provides various examples of a water flosser (which may also be referred to as an oral irrigator) and associated components. The water flosser may be configured as a battery-powered, cordless device. The water flosser may include various features and components to enhance ergonomics and usability of the device and to improve the performance of the device.

In some embodiments, the water flosser may include a body and a refillable reservoir. A pump, which may be driven by a motor, is fluidly coupled to the reservoir, such as by one or more valves and appropriate conduits and tubing. A tip having an outlet is in fluid communication with the pump such that water or another fluid is delivered through the tip at a desired pressure, flow rate, pulse frequency or other flow characteristic. In some embodiments, the water flosser may include a cap rotatably coupled with the body. The cap may be configured to rotate the tip relative to the body to control the orientation of the outlet of the tip and, thus, control the direction of fluid discharge relative to the position of the body.

The water flosser may be configured so that different tips may be selectively attached to, and removed from, the water flosser. A latch assembly may be configured for the selective retention and release of a tip. In one embodiment, an ejector button may be located on or in the cap such that, upon actuation of the ejector button, the latch assembly releases the tip for removal. In one embodiment, the ejector button may be located along, or positioned within, an upper surface of the cap.

In one embodiment, the latch assembly may include a tip holder fixed to the cap and a collet member fixed to the tip holder. A latch may be associated with the tip holder and include a pair of grasping fingers. A ramped member may be configured to engage the grasping fingers and effect lateral displacement of the grasping fingers away from each other. The ejector button may be configured to engage the ramped member to actuate the latch. The collet may be rotatably coupled to a pump outlet about a defined axis, but fixed in a direction along the defined axis relative to the pump outlet. The latch assembly, including the above-indicated components, the cap, and the tip may be configured to rotate as a unit about the defined axis relative to the body of the water flosser. In some embodiments, the latch assembly, the cap, and the tip rotate as a unit relative to the pump outlet.

In some embodiments, the reservoir of the water flosser may be configured to concentrate a volume of fluid about the inlet of a tube that is coupled with a pump inlet. For example, in some embodiments a lower portion of the reservoir may include tapered walls leading to a floor adjacent the inlet of the tube. In one embodiment, at least one of the walls includes a planar upper portion. In one embodiment, at least one of the walls exhibits a curved surface along its upper portion. In one embodiment, each of the walls may include a curved lower portion joining with a substantially circular floor.

In some embodiments, these features and components may be included in a water flosser to the exclusion of some, or all, of the others. In some embodiments, any or all of these features and components may be combined together without limitation.

Figure 2:
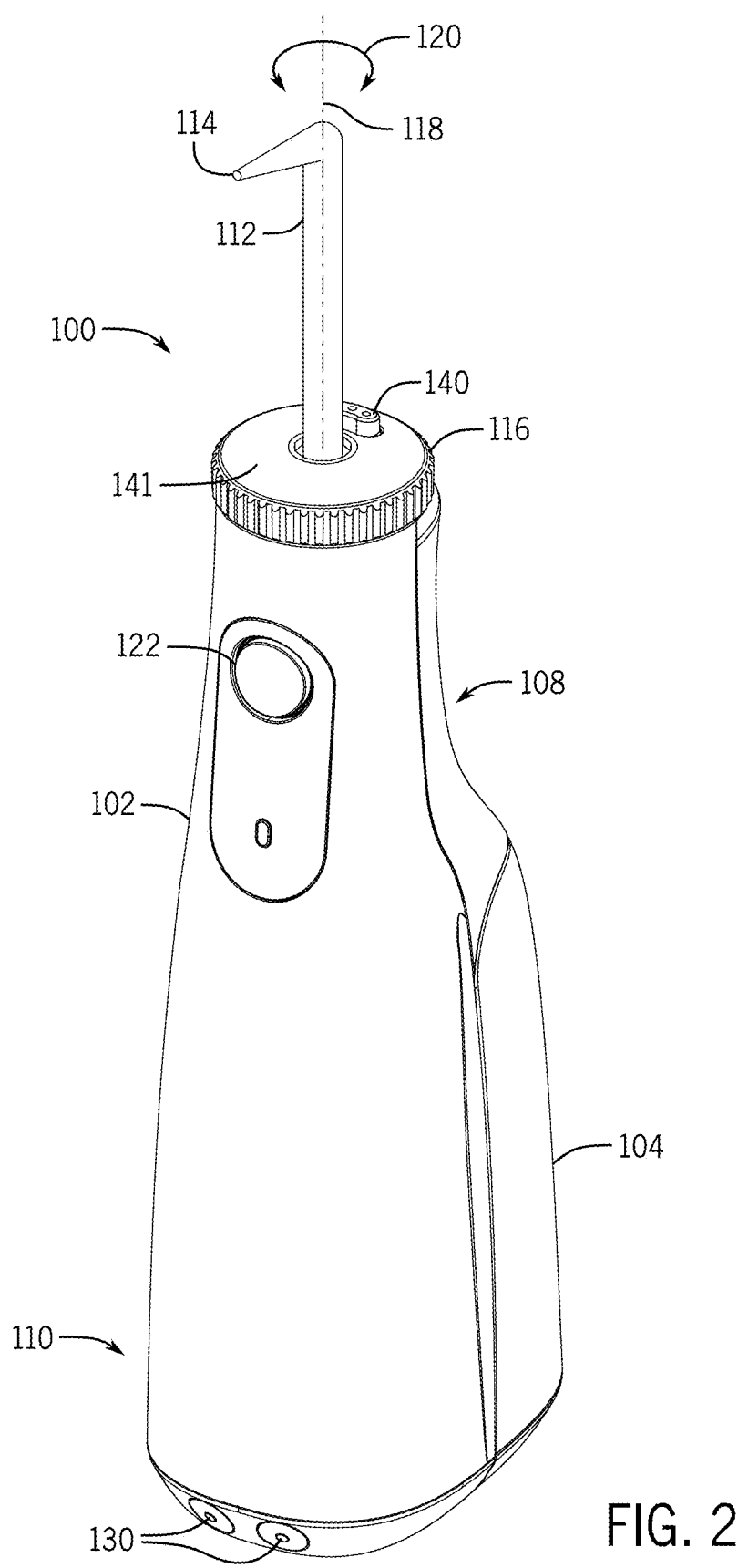
FIG. 2 is a front perspective view of the water flosser of FIG. 1.
Figure 3:
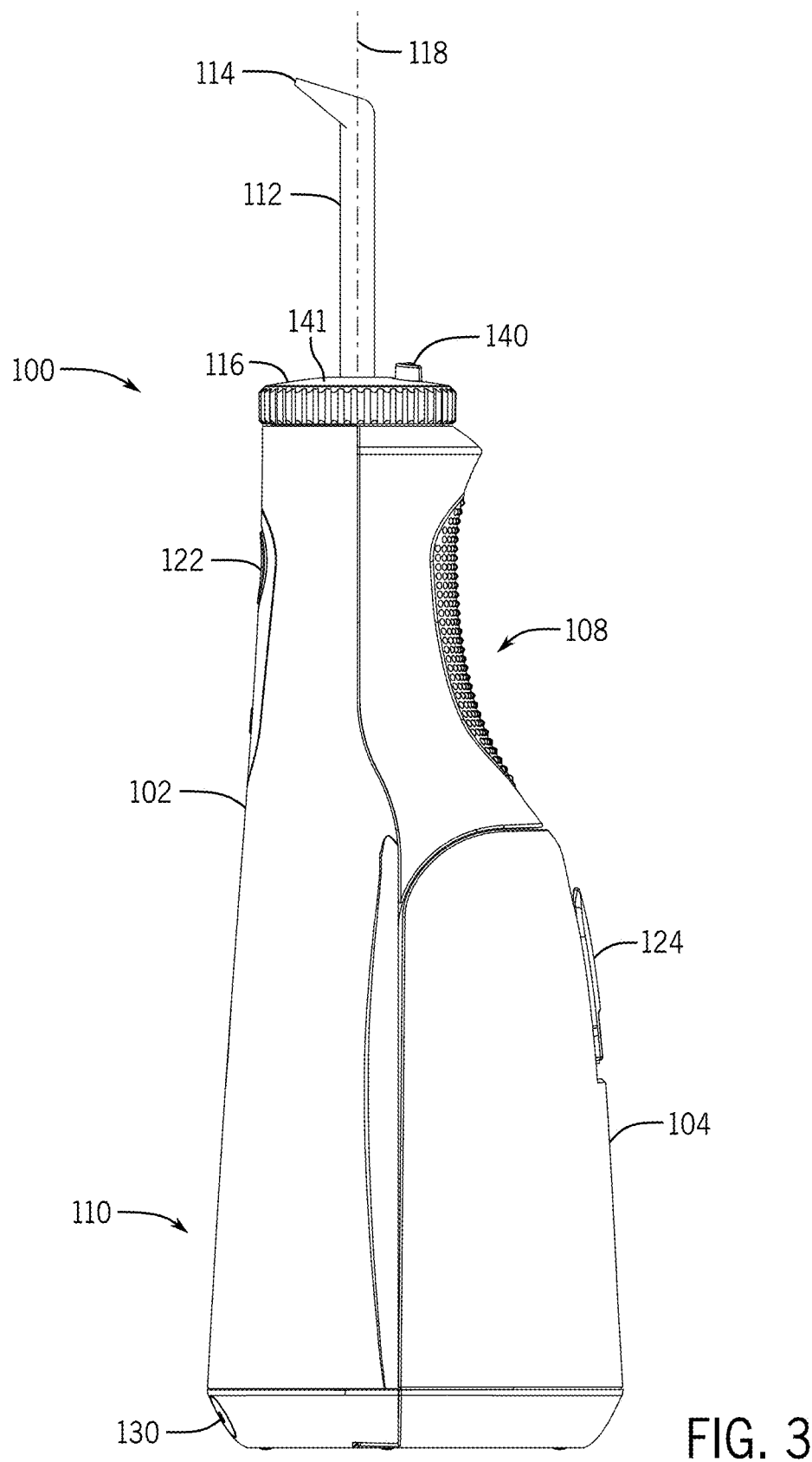
FIG. 3 is a side elevation view of the water flosser of FIG. 1.

With reference now to the figures, an example water flosser will be discussed in more detail. Referring to FIGS. 1-3, in one example, a hand-held water flosser 100 has a body 102 and a refillable reservoir 104 for storing fluid. The body 102 and the reservoir 104 are ergonomically shaped having a slender upper portion 108 and a relatively enlarged lower portion 110. The body 102 is shaped such that a user can comfortably grasp the water flosser 100 about the upper portion 108 while the enlarged lower portion 110 may enable the storage of fluids within the reservoir 104 and also provide a stable platform to keep the water flosser 100 in an upright or vertical orientation when the water flosser 100 is placed on a supporting surface such as a table or a countertop.

The water flosser 100 further includes a tip 112 having an outlet 114 through which pressurized fluid passes during operation by a user. The tip 112 may be coupled with a rotatable cap 116. The tip 112 may be non-rotatably coupled to the cap 116 such that the tip 112 and the cap 116 rotate in unison (e.g., as a single unit) relative to the body 102 about an axis 118 as indicated by directional arrow 120. Rotation of the tip 112 enables the outlet 114 to be selectively positioned by a user so that the direction of the fluid stream exiting the outlet 114 may be altered during use and tailored to a user's preferences.

A lid 124 may be associated with the reservoir 104 and configured to expose an opening to the reservoir enabling a user to fill the reservoir 104 with a fluid. When the reservoir 104 is filled to a desired level, the lid 124 may be closed to seal the opening and prevent the fluid from spilling out of the reservoir 104 when the water flosser 100 is placed in a variety of different orientations during use. In one embodiment, the lid 124 may be coupled to the reservoir 104 or to the body 102 (e.g., by way of a hinge or lanyard structure) to retain the lid 124 with the water flosser 100 when the opening is exposed for filling with fluid.

As seen FIG. 2, a pair of contact members 130 may be positioned on the body 102 for contact with and electrical connection to a charging device (e.g., a charging cradle or a charging base, not shown) to charge a battery positioned within the body 102 of the water flosser 100. The contact members 130 may be located along an upwardly-extending surface of the body 102. For example, the contact members 130 may be positioned on an angled surface of the body 102 that tapers inwardly toward a bottom wall of the body 102. The contact members 130 may be substantially flush with an outer surface of the body 102.

An ejector button 140 is positioned within a portion of the cap 116 and may be used to actuate a latch mechanism (discussed in further detail below) to release the tip 112 from the remainder of the water flosser 100. In one embodiment, the ejector button 140 may be located in an upper surface 141 of the cap 116 and configured to be displaced in a direction that is substantially parallel with the rotational axis 118 and generally towards the body 102 of the water flosser 100.

Figure 4A:
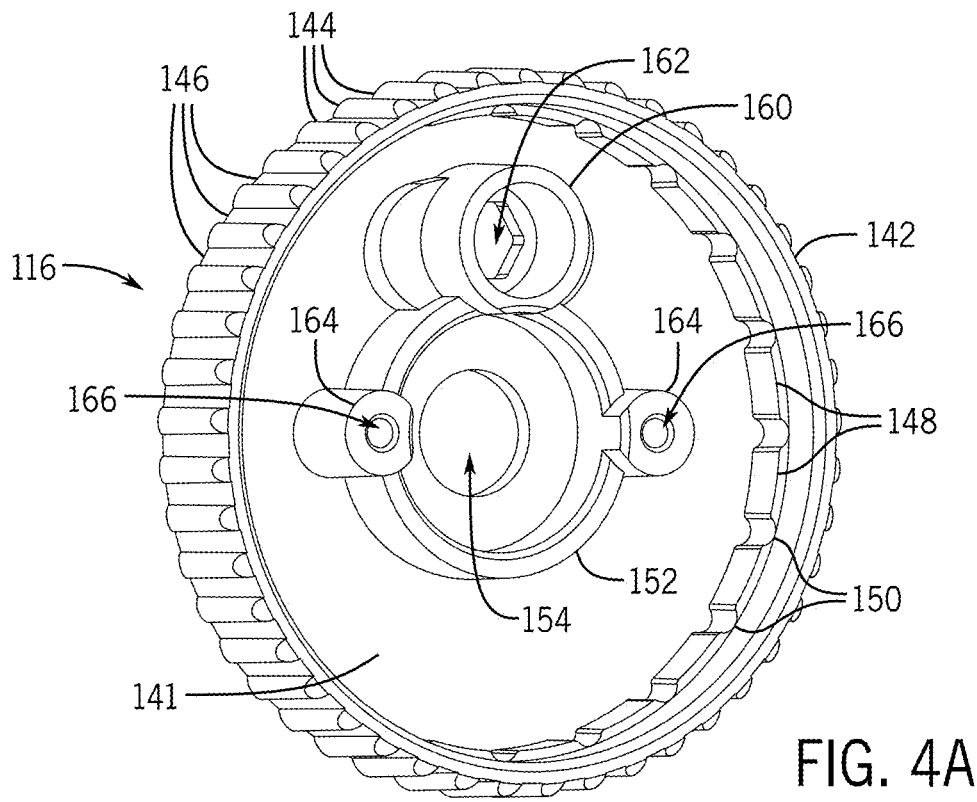
FIGS. 4A and 4B are a bottom perspective and bottom plan views of a cap of the water flosser of FIG. 1.
Figure 4B:
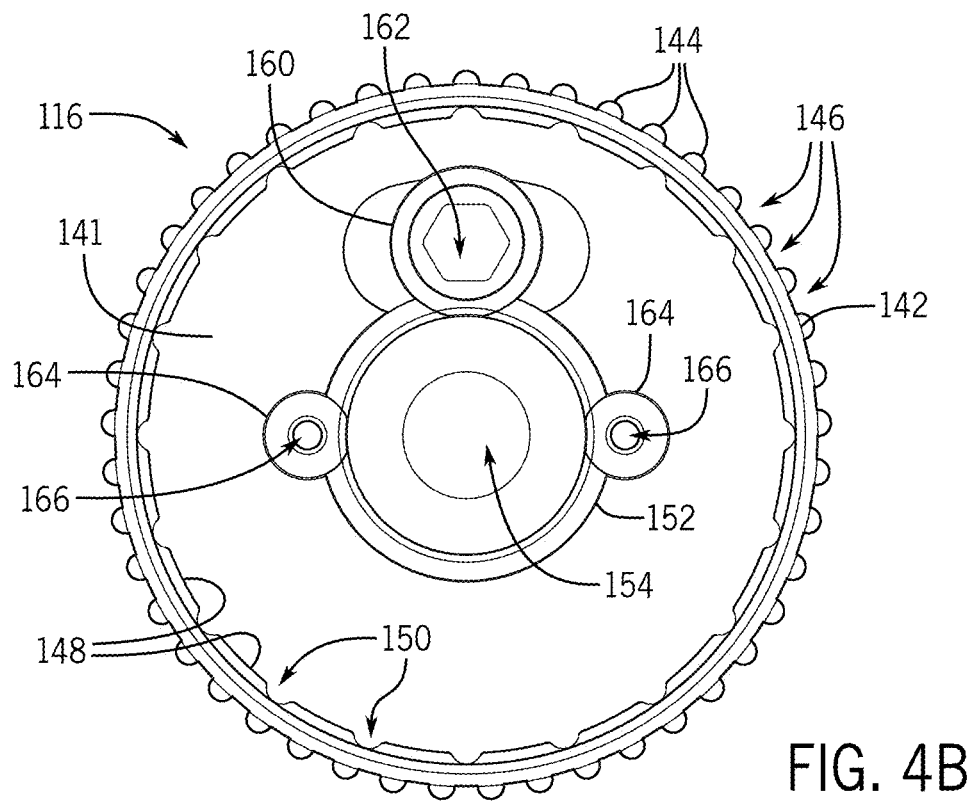

Referring to FIGS. 4A and 4B, the bottom side of the cap 116 is illustrated in accordance with an embodiment of the present disclosure. The cap 116 includes an upper disc or wall 141 and a circumferential side wall 142. A user engagement feature, such as a plurality of alternating ridges 144 and grooves 146, may be formed on a radial outer (external) surface of the circumferential side wall 142. The outer ridges 144 and groove 146 may provide a gripping surface for a user to grab when rotating the cap 116 and tip 112 relative to the body 102 of the water flosser 100. The radial outer surface of the circumferential side wall 142 may be substantially flush with or extend radially outward of the top portion of the body 102 to facilitate engagement of the cap 116 by a user desiring to rotate the tip 112 via the cap 116. For example, to rotate the tip 112, the user may use one of their fingers, such as their thumb, to engage the ridges 144 and rotate the cap 116, thereby rotating the tip 112, while continuing to hold the body 102 of the water flosser 100 with their other fingers. The ejector button 140 may project upwardly from the upper surface 141 of the cap 116 and may be depressible by a user to actuate the latch mechanism, thereby releasing the tip 112.

A plurality of alternating ridges 148 and grooves 150 may be formed on a radial inner (internal) surface of the circumferential side wall 142. The inner grooves 142 may be configured for engagement with detent members located at an upper portion of the body 102 as will be discussed in further detail below.

The cap 116 may include an annular wall 152 extending from a lower surface of the disc 140 and surrounding an opening 154 through which a tip 112 (not shown in FIGS. 4A and 4B) passes for coupling with a latch assembly of the water flosser 100. Another annular wall 160 may be formed adjacent to the first annular wall 152. The second annular wall 160 may surround another opening 162 that receives a shaft of the ejector button 140. One or more bosses 164 may be formed adjacent the first annular wall 152 and include threaded holes 166 for receipt of fasteners and for coupling with a latch assembly as discussed below.

Figure 5:
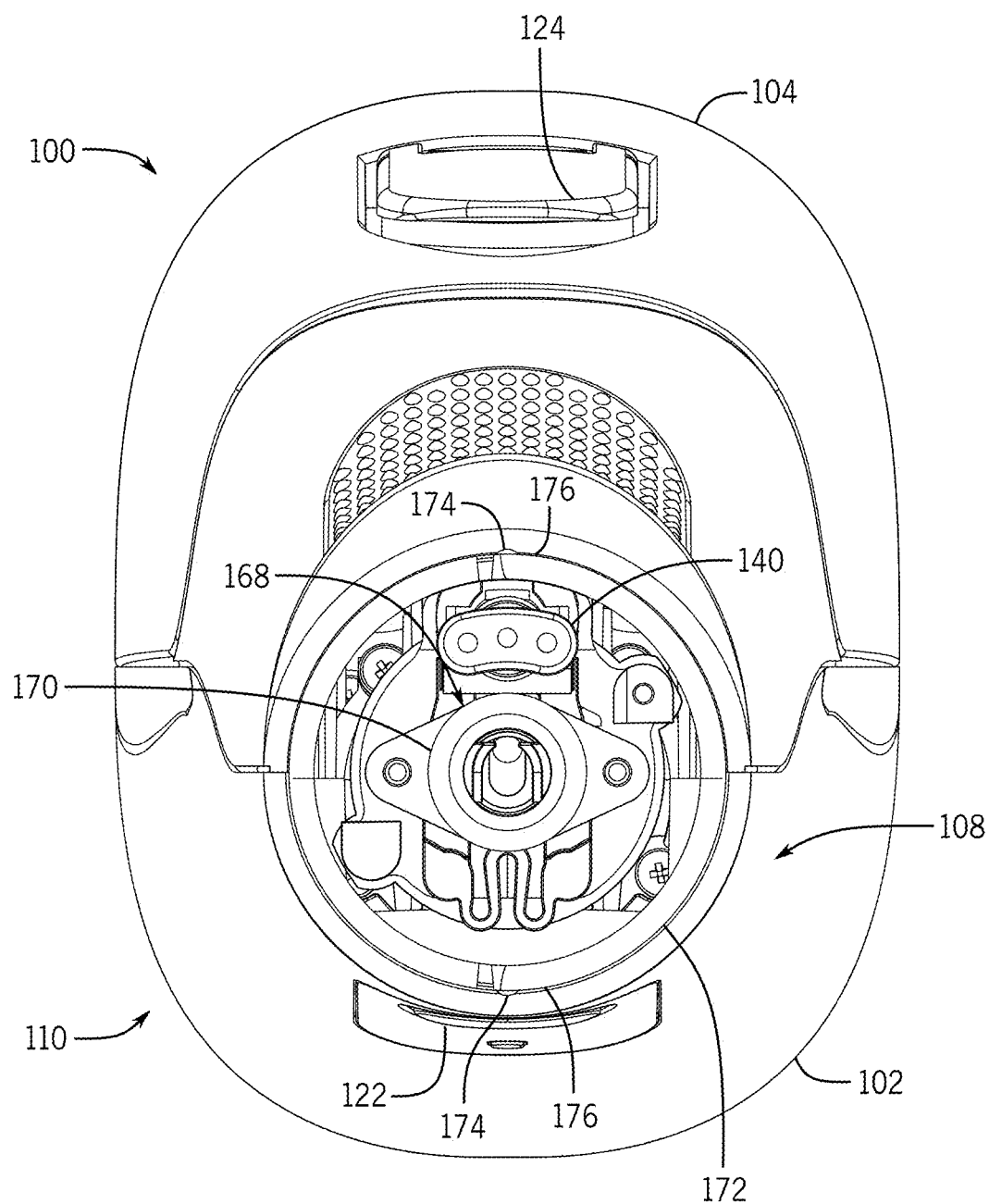
FIG. 5 is top plan view of the water flosser of FIG. 1 with the cap removed.
Figure 6:
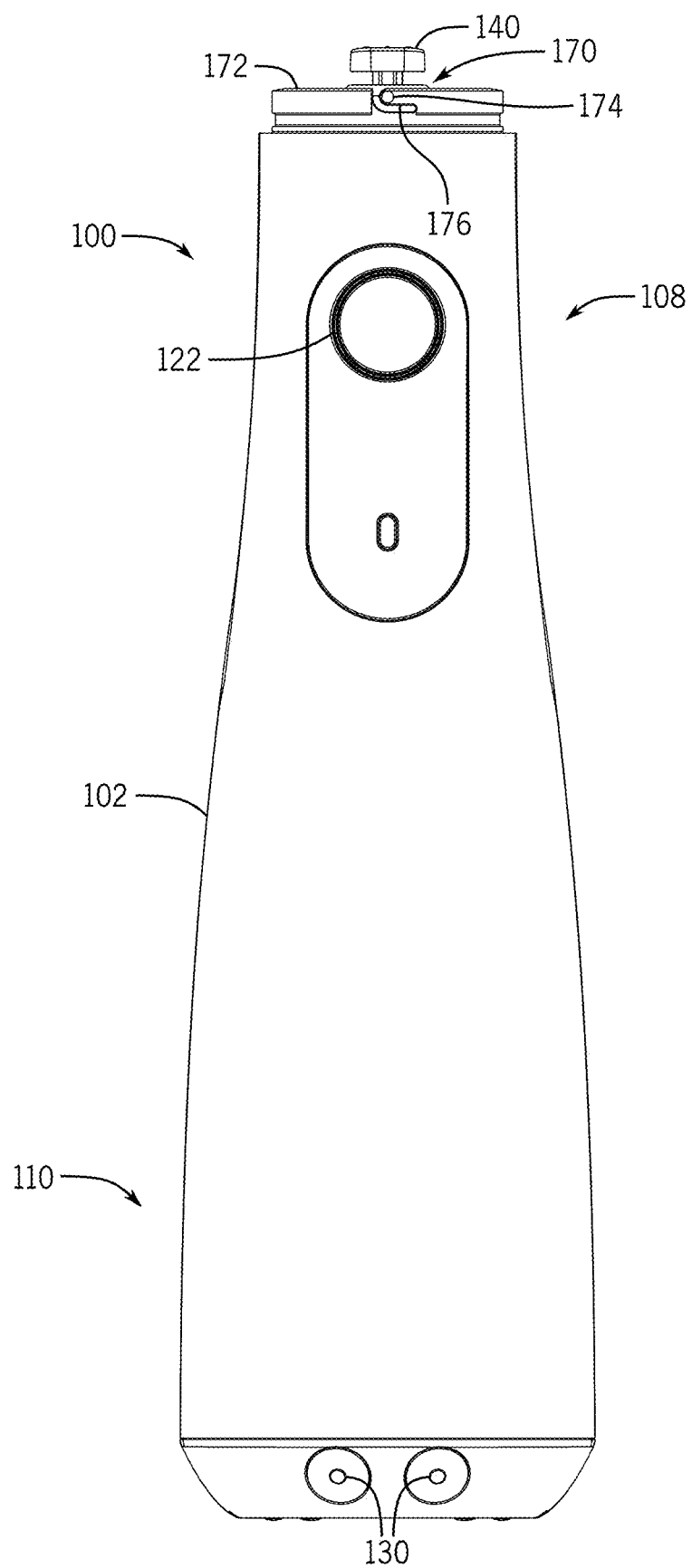
FIG. 6 is a front elevation view of water flosser as shown in FIG. 5 with the cap removed.

Still referring to FIGS. 4A and 4B with additional reference to FIGS. 5 and 6, various sealing features may be incorporated in association with the cap 116. For example an O-ring 168 or other sealing member (see FIGS. 5 and 6) may be positioned on the end of, or about the circumference of, a stem portion 170 of a latch assembly, and the stem portion 170 may at least partially extend within the cavity formed by the first annular wall 152. The O-ring 168 provides a seal between the stem portion 170 and the cap 116 to prevent ingress of material through the opening 154 and into the body 102 of the water flosser 100. Other seal members may similarly be associated with, for example, the second annular wall 162 and its associated opening 164 in order to seal the internal components of the water flosser from debris, fluid or other contaminants.

Referring more specifically to FIGS. 5 and 6, a collar 172 is located at the upper end of body 102 and may include a pair of diametrically opposed detent members. The detent members may each include a protrusion 174, such as a semi-spherical or semi-cylindrical protrusion, located on an end of a cantilevered finger 176. The protrusions 174 are sized and configured to engage the inner grooves 150 of the cap 116 and resist rotation of the cap 116 about the axis 118 relative to the body 102 until a rotating force of a specified magnitude is applied to the cap 116 relative to the body 102. When the rotating force of a specified magnitude (or greater) is applied to the cap 116, the cantilevered fingers 176 are elastically displaced in a radially inward direction such that the protrusions 174 slide along the inner ridges 148 as the cap 116 rotates until the protrusions 174 reengage another pair of inner grooves 148. The cap 116 may be rotated to a desired rotational position relative to the body 102 and retained in the desired position by engagement of the protrusions 174 with a corresponding pair of inner grooves 148.

Figure 7:
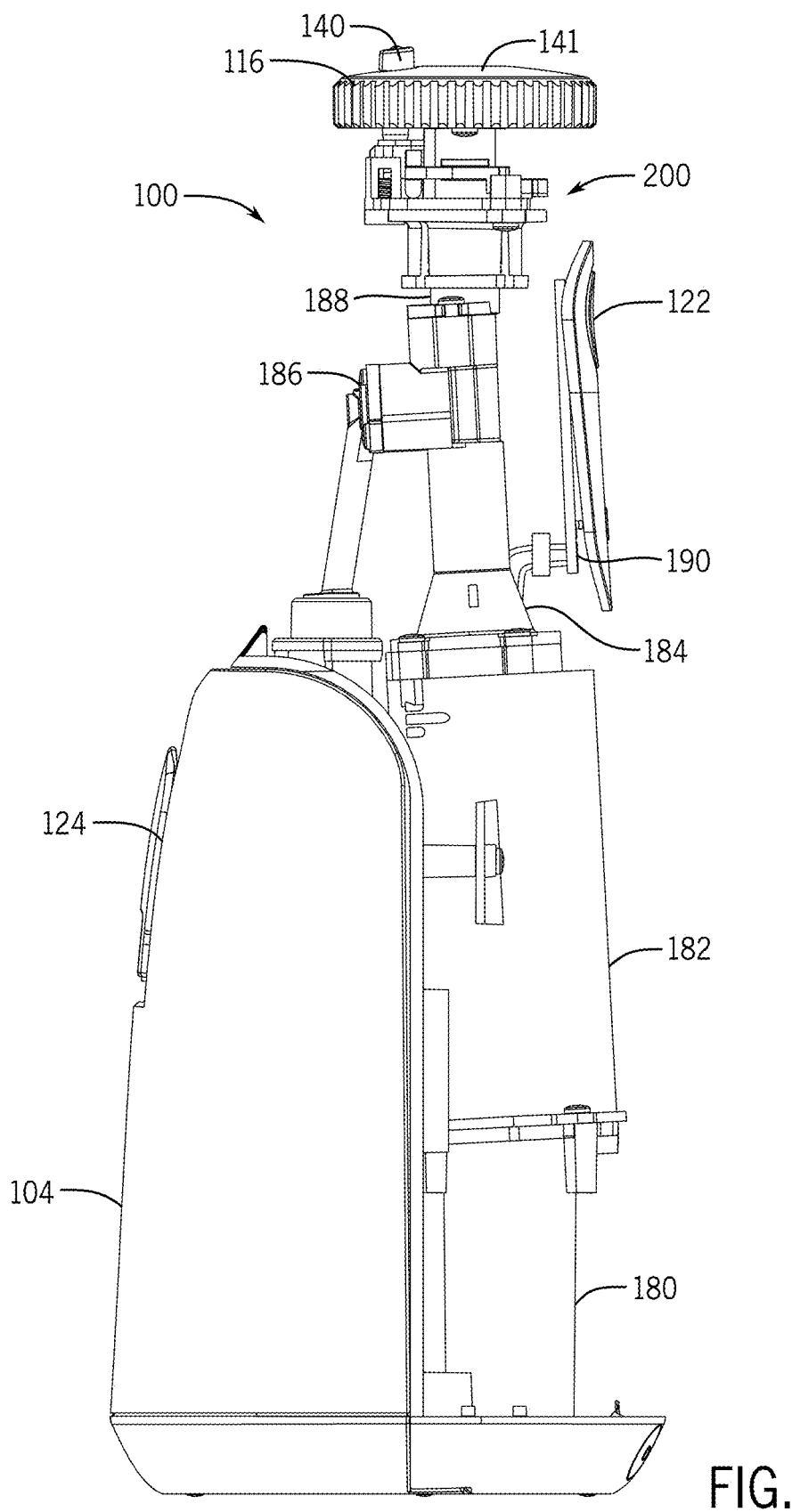
FIG. 7 is a side elevation view of the water flosser of FIG. 1 with various housing portions removed.
Figure 8:
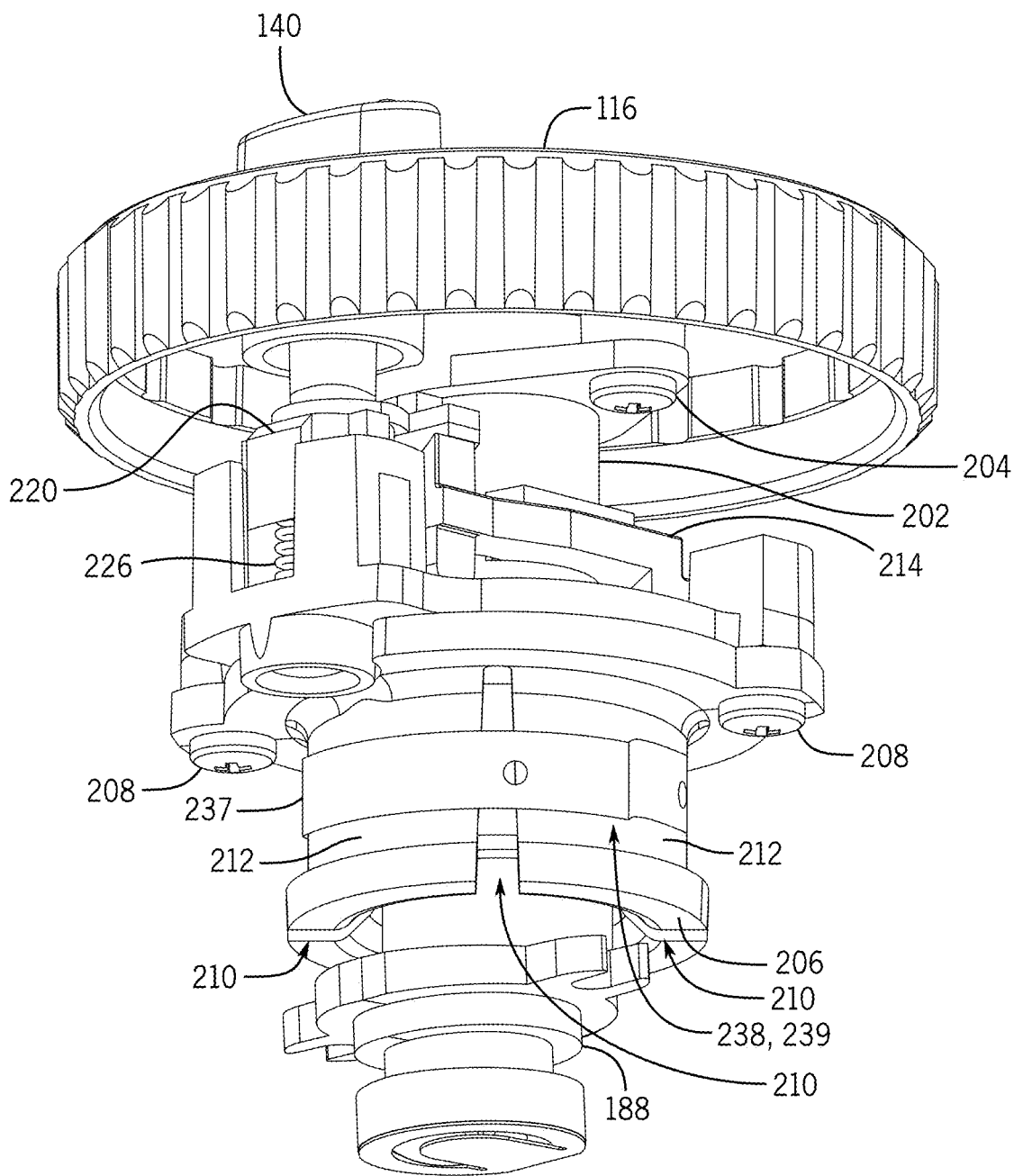
FIG. 8 is an enlarged perspective view of a latch assembly depicted in FIG. 7.
Figure 9:
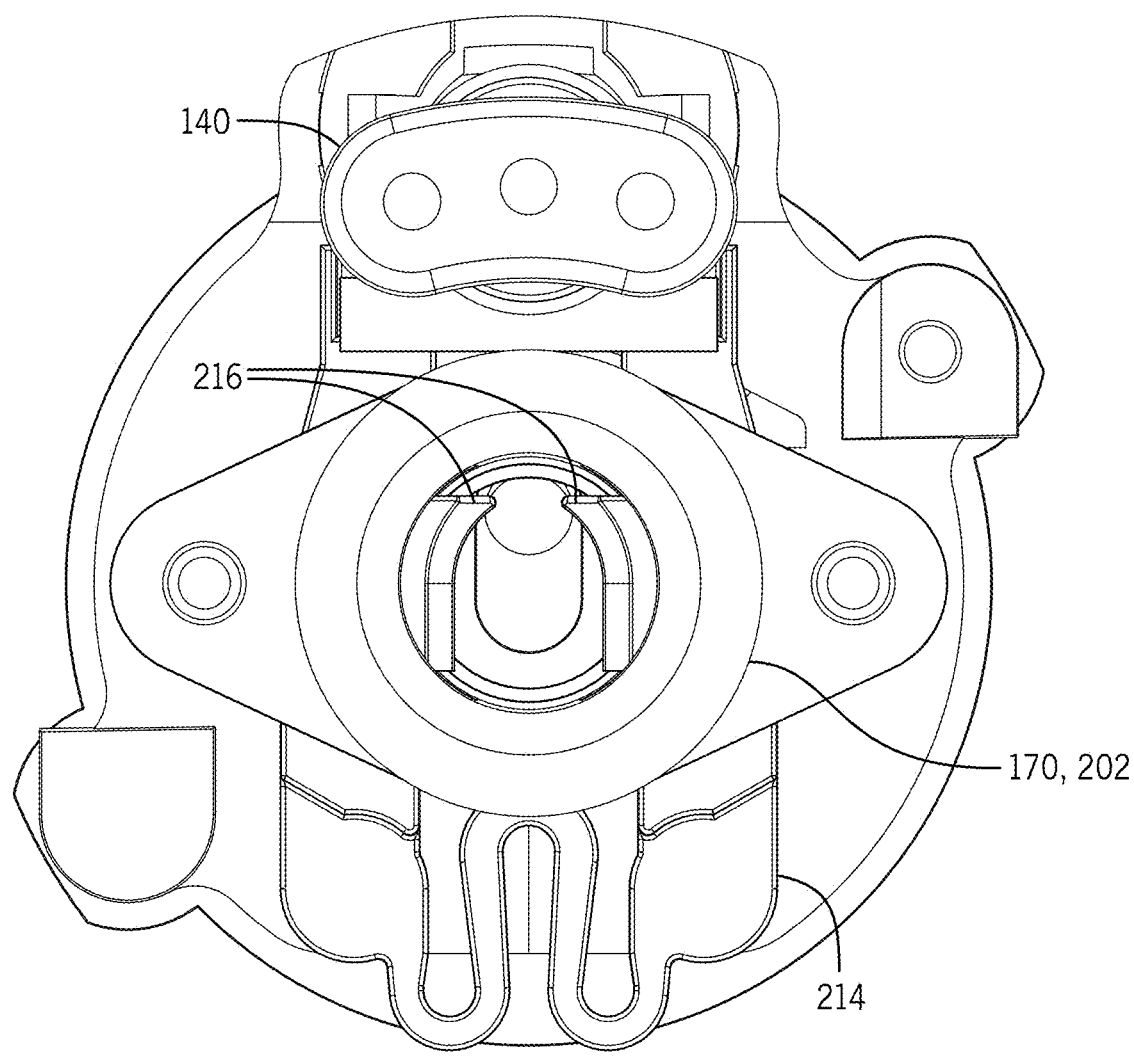
FIG. 9 is a top plan view of the latch assembly shown in FIG. 8 with the cap removed.

Referring now to FIG. 7, the water flosser 100 is shown with the outer housing of the body 102 removed to show various internal components. As seen in FIG. 7, the water flosser 100 may include a battery 180, such as a rechargeable battery or one or more replaceable batteries (e.g., AAA, AA, C, D or 9 volt batteries), in electrical communication with, and providing power to, a drive system, such as a motor 182. The motor 182 may be mechanically coupled with and configured to drive a pump 184. The pump 184 includes a pump inlet 186 in fluid communication with the reservoir 104 and configured to draw a fluid from the reservoir 104, pressurize the fluid, pass the pressurized fluid through a pump outlet 188, and discharge the fluid through the outlet 114 of the tip 112 (not shown in FIG. 7).

The water flosser 100 may include one or more user input devices 122 that may be actuated by a user to turn the water flosser 100 on or off, to alter the pressure, flow rate or pulsating pattern of the fluid stream, or to alter some other operational parameter of the water flosser 100. The user input device 122 may be electrically and operationally coupled with a controller 190 which may include a printed circuit board and an integrated circuit device. The controller 190 may control, for example, the speed of the motor 182 and, thus, the output of the pump 184, based on user actuation of the user input device 122.

As seen in FIG. 7, the water flosser 100 includes a latch assembly 200 configured to selectively retain and release a tip 112. FIGS. 8-12 illustrate details of the latch assembly 200. The latch assembly 200 includes a tip holder 202 coupled with the cap 116 such as by screws 204 or other appropriate fasteners. The tip holder is configure to receive and hold the tip 112 in a position along the rotational axis 118 as depicted in FIGS. 1 and 2.

In one embodiment, a collet 206 is coupled with the tip holder 202 by screws 208, other appropriate fasteners or various joining techniques (e.g., ultrasonic welding, adhesives, or staking). In another embodiment, the collet 206 and tip holder 202 may be formed as an integral member, such as by molding, 3D printing or other appropriate manufacturing techniques. The collet 206 may include a plurality of slits or grooves 210 extending axially along the body of the collet 206, defining individual wall portions 212.

Figure 10:
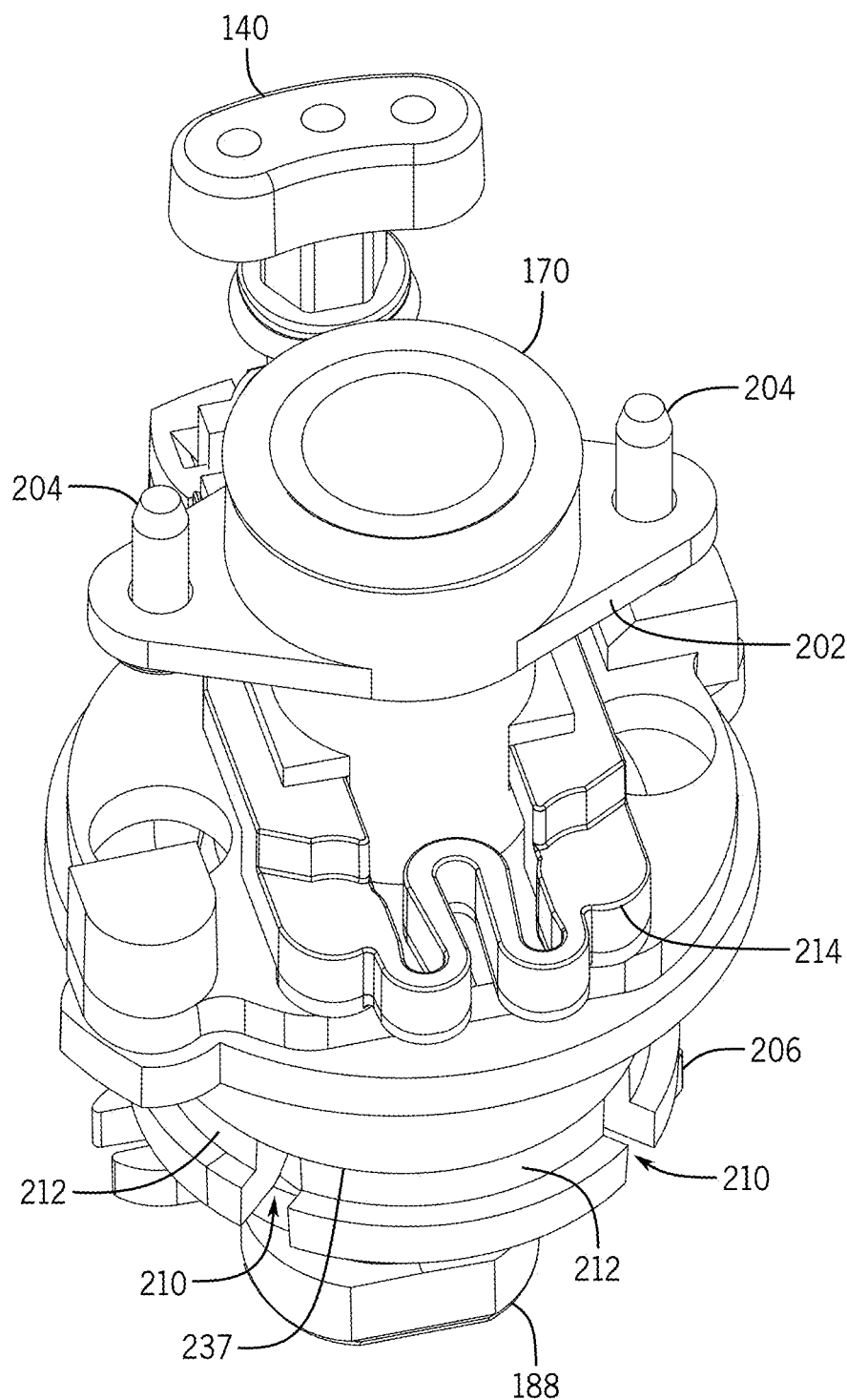
FIG. 10 is another perspective view of the latch assembly shown in FIG. 8 with the cap removed.
Figure 11:
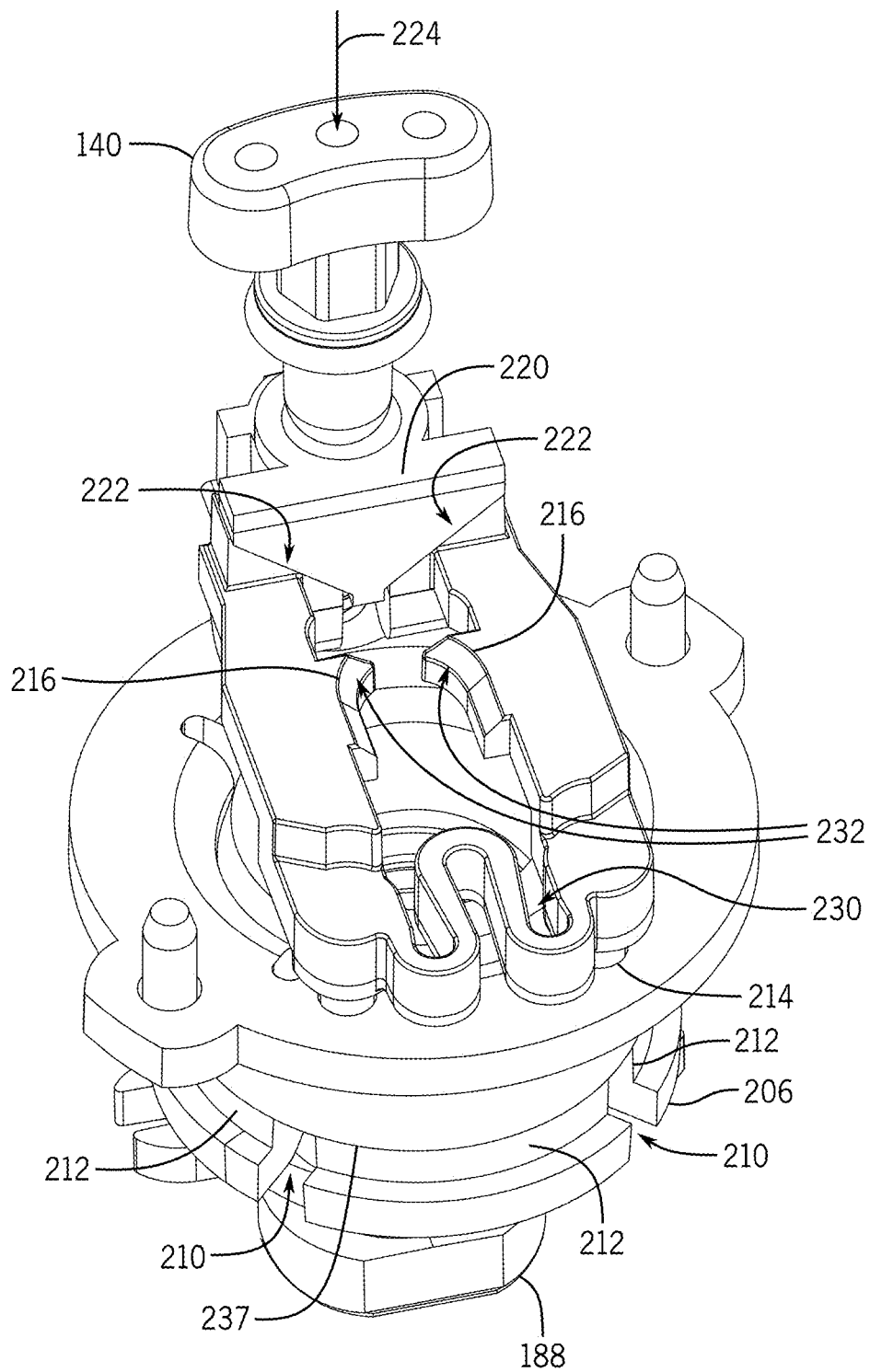
FIG. 11 is a perspective view of the latch assembly as shown in FIG. 10 with a tip holder removed.

The latch assembly 200 includes a latch 214 having grasping fingers 216 configured to engage a ridge, shoulder or groove of an associated tip 112 and thereby retain the tip 112 within the tip holder 202 until the latch assembly 200 is actuated. A ramped member 220 is configured to engage ramped surfaces 222 of the latch 214. When the ejector button 140 is pressed downward, as indicated in FIG. 11 by directional arrow 224, a force is transmitted through the ramped member 220 to the ramped surfaces 222, causing the grasping fingers 216 to become laterally displaced away from one another, enabling the release of a tip 112 positioned within the tip holder 202. A biasing member 226, such as a coiled spring, may be positioned between the ramped member 220 and some other portion of the latch assembly 200 (e.g., a portion of the tip holder 202 or a portion of the collet 206) to bias the ramped member 220 and associated ejector button 140 back to their unactuated positions. When the ramped member 220 is displaced back to its unactuated position, the grasping fingers 216 are displaced laterally back toward each other to return the latch to a "closed" state where the latch fingers 216 may grasp and retain a tip 112 within the tip holder 202, such as being positioned within an annular groove formed in an exterior surface of the tip 112. The grasping fingers 216 may be displaced back towards each other by way of external biasing members or, as shown in FIG. 10, due to the shape of the latch 214, which may include what may be termed an integrated biasing member or spring 230, which enables the grasping fingers 216 to be elastically deformed when the ejector button 140 is actuated and then return to their natural, closed state when the ejector button 140 is released.

The grasping fingers 216 may include tapered or ramped surfaces 232 configured to engage a ridge, shoulder or other feature located on the shaft of a tip 112, such that when a tip 112 is inserted into the tip holder 202, the ridge of the tip 112 abuts the tapered or ramped surfaces 232 of the grasping fingers 216 and causes the grasping fingers 216 to be laterally displaced away from one another as the tip 112 becomes further displaced into the tip holder 202 during installation. Once the ridge of the tip member 114 has passed below the grasping fingers 216 of the latch 214, the grasping fingers 214 are displaced back towards each other due to a biasing force provided by the integrated biasing member 230 or other biasing members.

Figure 12:
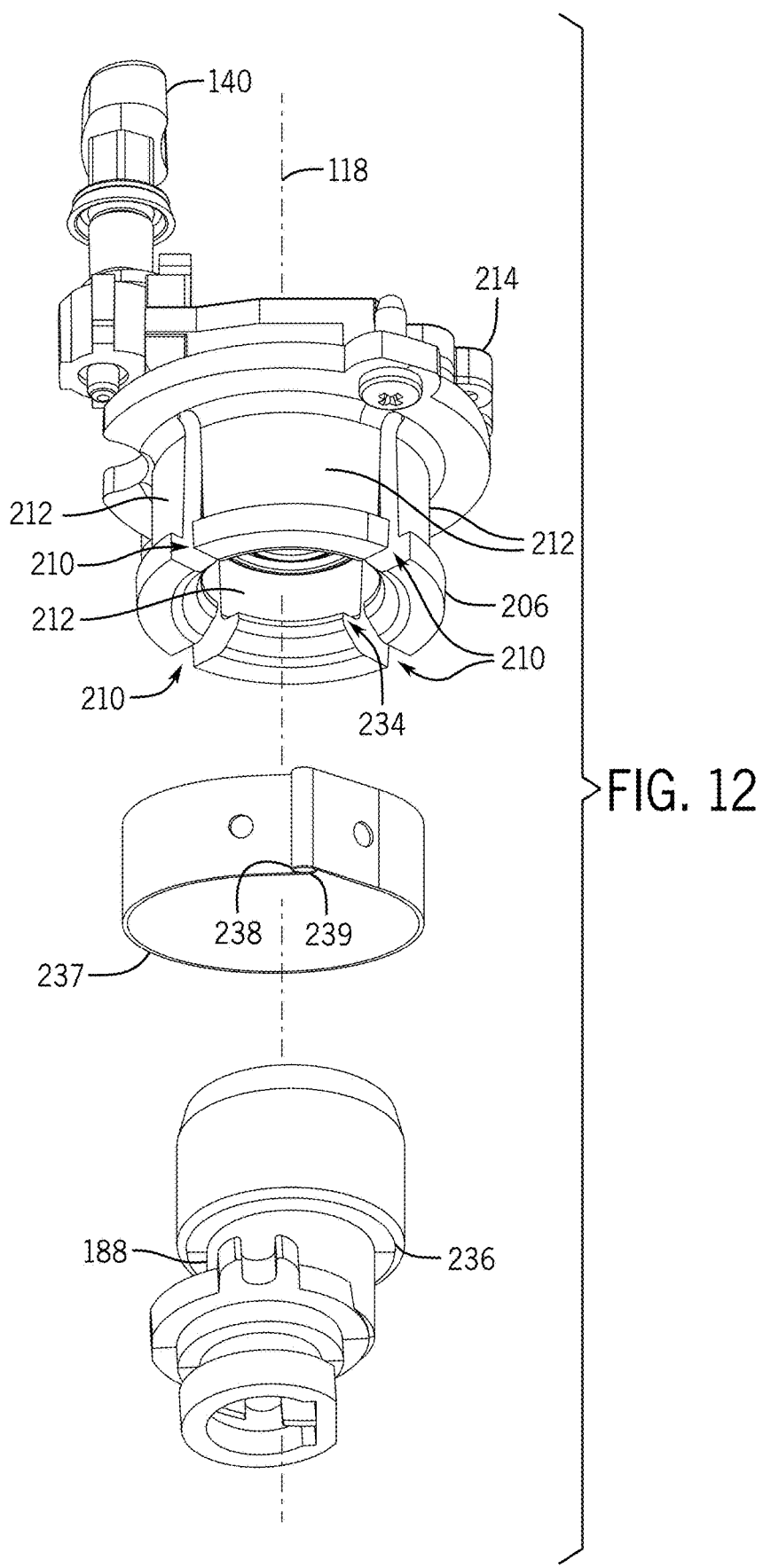
FIG. 12 is a partially exploded view of the latch assembly as shown in FIG. 11.

As previously noted, the collet 206 may include a plurality of partially segmented wall portions 212 formed from a generally annular or cylindrical member. As seen in FIG. 12, each of the wall portions 212 may include an inner radial lip 234 or ledge. The radial lips 234 are configured to engage a shoulder 236 formed on the pump outlet 188. Thus, when assembled, the collet 206 is coupled with the pump outlet 188 in such a way that the collet 206, along with the entire latch assembly 200, may rotate about an axis 118 relative to the pump outlet 188, while remaining axially fixed to the pump outlet 188.

In some embodiments, a retaining clip 237, band, or other retaining device may be positioned about the collet 206 to retain the wall portions 212 and prevent the wall portions 212 from becoming inadvertently displaced in a radial outward direction (relative to the axis 118). The retaining clip 237 may include engaging features 238 and 239 (e.g., mating lips) to hook or lock free ends of the retaining clip 237, enabling installation (and/or removal) of the retaining clip 237 from the collet 206. In some embodiments, other types of retaining devices may be utilized to retain the collet 206 in a locked position relative to the pump outlet 236.

Thus, when assembled, the cap 116, the tip 112 (when installed), and the latch assembly 200 may rotate in unison (e.g., as a single unit) about the axis 118 relative to the pump 184 and relative to the body 102. Such a construction may enable a more compact and ergonomic design of the water flosser 100 and enable the ejector button 140 to be moved to a location where there may be less opportunity for inadvertent actuation by a user during operation of the water flosser 100.

Figure 13:
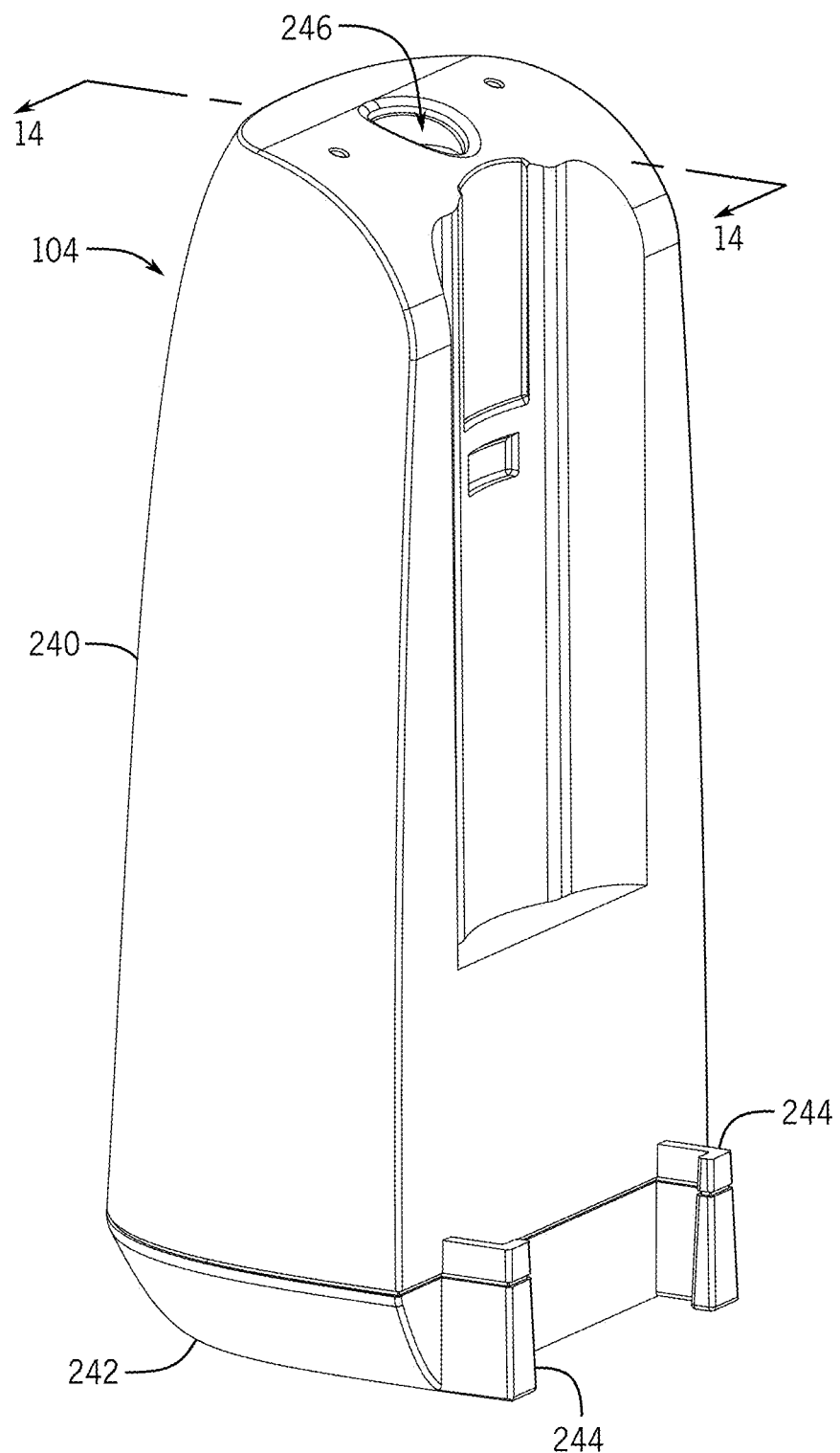
FIG. 13 is a perspective view of a reservoir of the water flosser shown in FIG. 1.
Figure 14:
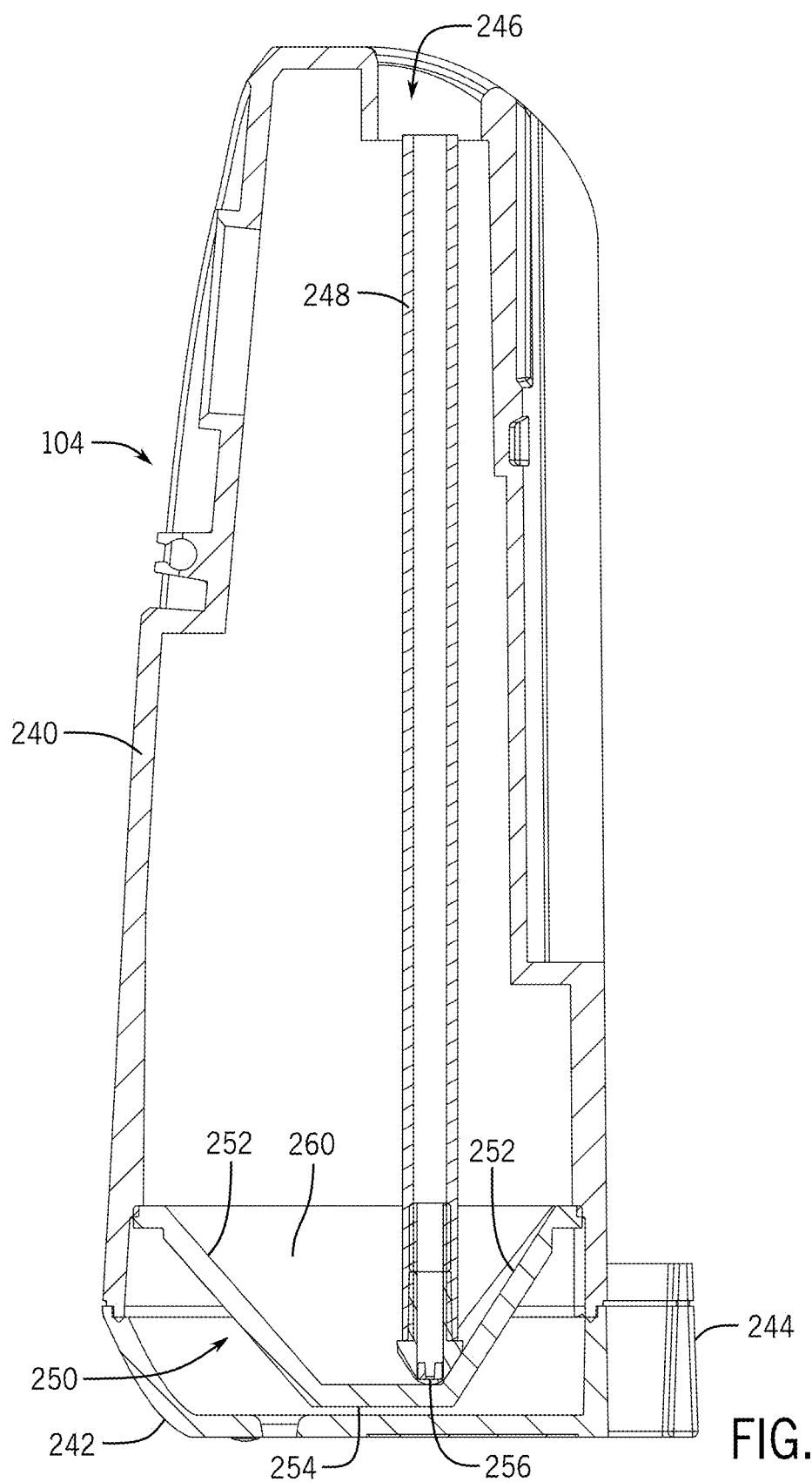
FIG. 14 is a cross-sectional view of the reservoir shown in FIG. 13 take along lines 14-14.
Figure 15:
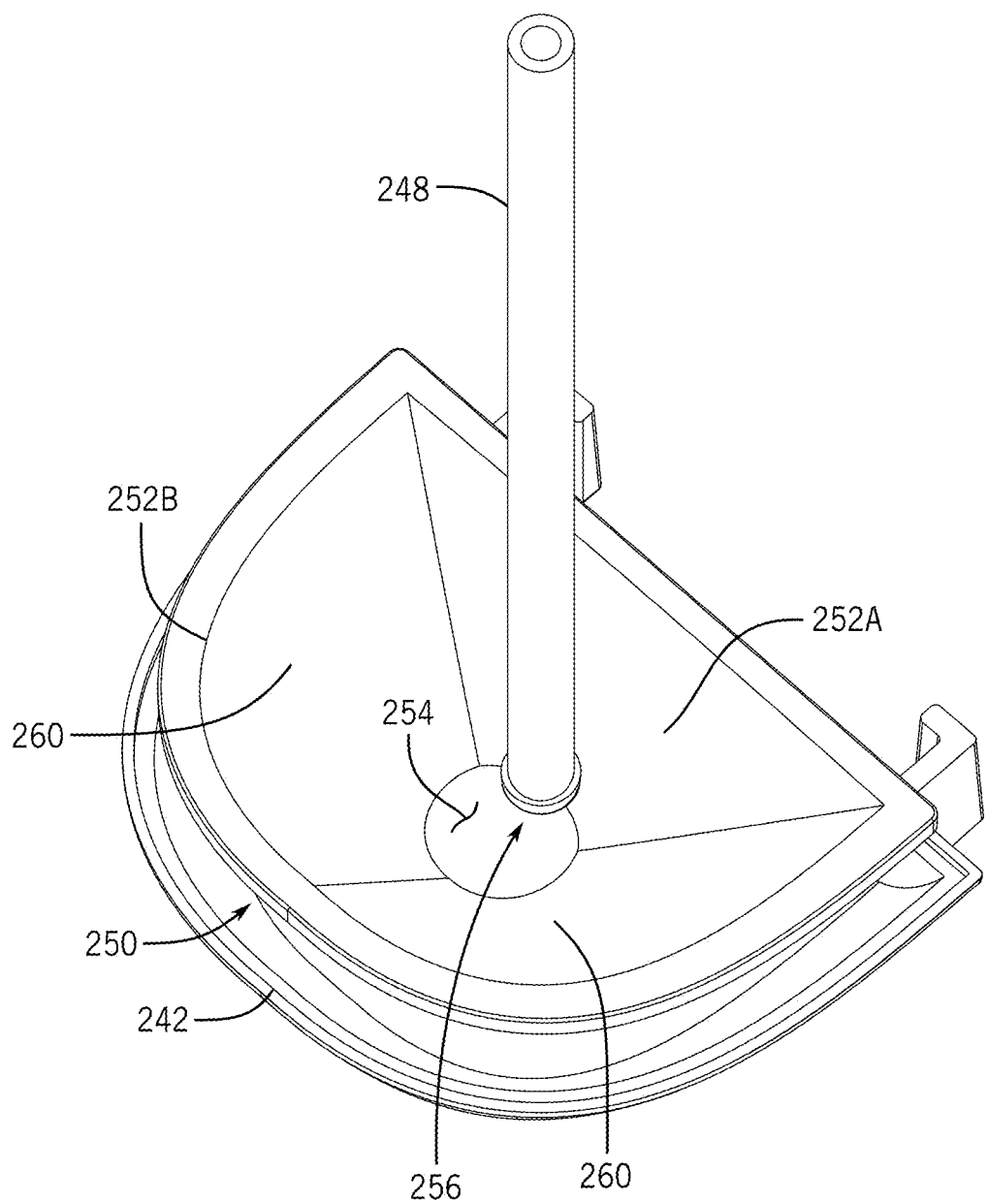
FIG. 15 is a perspective view of bottom portion of the reservoir shown in FIG. 13.

Referring now to FIGS. 13-15, various aspects of a reservoir 104 are illustrated. The reservoir 104 may include an upper housing 240 and a lower housing 242. Bracket members 244 may be formed in or coupled to the upper housing 240, the lower housing 242 or both for coupling with the remainder of the body 102 of the water flosser 100. An opening 246 may be formed in the upper housing 240 to provide passage of a tube 248 that is used to draw fluid from the reservoir 104 into the pump 184 (not shown in FIGS. 13-15).

As seen in the cross-sectional view depicted in FIG. 14, a bottom section 250 of the reservoir 104 may include inclined walls 252 that define a tapered volume converging toward each other as they extend to a floor 254. The tapered volume of the bottom section 250 results in a decreasing cross-sectional area (taken in a direction perpendicular to a length of the tube 248) as the inclined walls 252 extend from their upper most edges toward the floor 254. When fluid is consumed from the reservoir 104 such that the remaining fluid level is largely contained within the bottom section 250, the tapered configuration enables the pump 184 to continue to draw fluid from a smaller remaining volume by concentrating the remaining volume of fluid about the inlet 256 of the tube 248. The bottom section 250 of the reservoir 104 may be received within the lower housing 242 such that the upper housing 240 and the lower housing 242 form the exterior of the reservoir 104. The bottom section 250 may be hermetically sealed to the upper housing 240, such that the upper housing 240 and the bottom section 250 collectively define the total interior volume of the reservoir 104. The lower housing 242 may be attached to the upper housing 240 and may act as a cover for the bottom section 250.

As seen in FIG. 15, in one embodiment, the bottom section 250 may include a first wall 252A having a substantially planar upper portion and another wall 252B having upper portions that may include one or more curved surfaces 260. In the embodiment shown, the lower portions of the walls 252A and 252B may each include curved surfaces that join with a floor 254 exhibiting a substantially circular geometry. Such a geometry aids in concentrating fluid immediately about the inlet 256 of the tube 248. Of course other combinations of planar and curved wall surfaces are contemplated, and other geometries, such as ovals and polygons, are contemplated for the floor 254.

The foregoing description has broad application and the discussion of any example is meant only to be exemplary and is not intended to suggest that the scope of the disclosure, including the claims, is limited to these examples. It is also noted that features, components or aspects of one embodiment may be combined with features, components or aspects of other embodiments without limitation. Although the present invention has been described with reference to specific examples, persons skilled in the art will recognize that changes may be made in form and detail without departing from the spirit and scope of the invention. The invention is limited only by the scope of the following claims.

What is claimed is:

1. A water flosser comprising:
    a body comprising an engagement assembly;
    a cap rotationally coupled to the body via the engagement assembly and including a user engagement surface;
    a tip extending through an opening in the cap; and
    a latch assembly secured to the cap by a fastener and configured to move corresponding to a movement of the cap via a rotational force applied to the user engagement surface, wherein the latch assembly is coupled to the body via the cap and includes a tip holder configured to selectively retain the tip to the cap and move the tip with the cap in response to the rotational force applied to the user engagement surface, wherein the cap, the tip, and the latch assembly are configured to rotate as a unit about a defined axis relative to the body in response to the rotational force applied to the user engagement surface while the cap is rotationally coupled to the body, wherein the engagement assembly prevents vertical movement of the cap relative to the body during rotation of the cap, the tip, and the latch assembly about the defined axis of the body.

2. The water flosser of claim 1, further comprising an ejector button located on a portion of the cap and associated with the latch assembly, wherein, upon actuation of the ejector button, the latch assembly releases the tip.

3. The water flosser of claim 2, wherein the ejector button extends through an upper surface of the cap.

4. The water flosser of claim 2, wherein actuation of the ejector button includes application of a force in a direction parallel to the defined axis.

5. The water flosser of claim 2, wherein the tip holder is configured to support the tip and the latch assembly further comprises:
    a pump body positioned within the body; and
    a collet fixedly coupled with the tip holder and rotatably coupled to the pump body.

6. The water flosser of claim 5, wherein the latch assembly further comprises:
    a latch having a pair of grasping fingers; and
    a ramped member disposed between the ejector button and the pair of grasping fingers.

7. The water flosser of claim 6, wherein, upon actuation of the ejector button, the ramped member displaces the pair of grasping fingers laterally away from one other.

8. The water flosser of claim 1, further comprising a collar coupled to the body, the collar having a detent mechanism comprising a protrusion located on a cantilevered finger.

9. The water flosser of claim 8, wherein the cap includes a plurality of grooves located on an inner surface of the cap and configured for selective engagement with the protrusion.

10. The water flosser of claim 1, further comprising:
    a reservoir associated with the body;
    a motor disposed in the body;
    a pump disposed in the body and in fluid communication with the reservoir; and
    a battery disposed in the body and in electrical communication with the motor.

11. The water flosser of claim 10, further comprising a tube having an inlet end disposed in the reservoir and being in fluid communication with an inlet of the pump.

12. The water flosser of claim 11, wherein the reservoir includes a lower portion having a tapered wall leading to a floor, the lower portion concentrating a volume of fluid about the inlet end of the tube.

13. The water flosser of claim 12, wherein the tapered wall includes a first inclined wall and a second inclined wall.

14. The water flosser of claim 13, wherein the first inclined wall includes a planar upper portion, and the second inclined wall includes an upper portion exhibiting a curved surface.

15. A water flosser comprising:
a body;
a cap rotatably coupled to the body;
a tip extending through an opening in the cap along a defined axis;
a latch assembly selectively retaining the tip, the latch assembly including an ejector button extending through an upper surface of the cap, wherein:
the upper surface is perpendicular to the defined axis;
actuation of the latch assembly includes displacement of the ejector button in a direction that is parallel with the defined axis, and
a portion of the latch assembly is configured to laterally displace and release the tip in response to the displacement of the ejector button.

16. The water flosser of claim 15, further comprising a pump body disposed within the body, wherein the latch assembly is rotatably supported by the pump body.

17. The water flosser of claim 15, wherein the portion comprises grasping fingers and the grasping fingers are configured to displace laterally away from one other in response to the displacement of the ejector button.

18. A water flosser comprising:
a body;
a reservoir associated with the body; and
a pump disposed in the body, the pump being in fluid communication with the reservoir and configured to draw fluid from the reservoir through a tube, pressurize the fluid, and discharge the fluid from a tip coupled to the body;
wherein the reservoir includes a lower section having a tapered volume converging towards a floor, and an inlet of the tube is disposed adjacent the floor;
wherein the lower section includes a first inclined wall and a second inclined wall;
wherein the first inclined wall includes a planar upper portion, and the second inclined wall includes an upper portion exhibiting a curved surface.

19. The water flosser of claim 18, wherein the first inclined wall and the second inclined wall each have lower portions exhibiting a curved surface.

20. The water flosser of claim 19, wherein the floor exhibits a substantially circular geometry.

21. The water flosser of claim 18, wherein:
the reservoir further includes an upper housing and a lower housing attached to the upper housing; and
the lower section is received within the lower housing and is attached to the upper housing such that the upper housing and the lower section collectively define the entire volume of the reservoir.

22. A water flosser comprising:
a body comprising an engagement assembly;
a cap coupled to the body via the engagement assembly;
a tip extending through an opening in the cap; and
a latch assembly selectively retaining the tip to the cap, wherein:
the cap, the tip, and the latch assembly are all rotatable as a unit about a defined axis relative to the body while the cap is coupled to the body,
the engagement assembly prevents vertical movement of the cap relative to the body during rotation of the cap, the tip, and the latch assembly about the defined axis of the body,
the engagement assembly comprises at least one protrusion; and
the cap comprises at least one groove defined on an interior surface thereof, wherein the at least one protrusion is configured to engage the at least one groove to prevent vertical movement of the cap relative to the body.

23. The water flosser of claim 22, wherein the engagement assembly further releasably secures the cap in a plurality of rotational positions relative to the body.

* * * * *